(12) United States Patent
Asaki et al.

(10) Patent No.: US 8,533,419 B2
(45) Date of Patent: *Sep. 10, 2013

(54) METHOD FOR CONTROLLING DATA WRITE TO VIRTUAL LOGICAL VOLUME CONFORMING TO THIN PROVISIONING, AND STORAGE APPARATUS

(75) Inventors: Katsutoshi Asaki, Yokohama (JP); Nobuo Beniyama, Yokohama (JP); Takato Kusama, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/610,317

(22) Filed: Sep. 11, 2012

(65) Prior Publication Data

US 2013/0007401 A1    Jan. 3, 2013

Related U.S. Application Data

(63) Continuation of application No. 12/852,563, filed on Aug. 9, 2010, now Pat. No. 8,285,963.

(30) Foreign Application Priority Data

Apr. 15, 2010   (JP) .................................. 2010-094059

(51) Int. Cl.
*G06F 12/00* (2006.01)
*G06F 13/00* (2006.01)

(52) U.S. Cl.
USPC ........... 711/170; 711/100; 711/118; 711/154; 711/200

(58) Field of Classification Search
USPC .......................... 711/100, 118, 154, 170, 200
See application file for complete search history.

(56) References Cited

U.S. PATENT DOCUMENTS

| 7,162,600 | B2* | 1/2007 | Kano et al. ................... 711/162 |
| 7,398,418 | B2 | 7/2008 | Soran et al. |
| 7,949,847 | B2* | 5/2011 | Murase ........................ 711/170 |
| 8,032,701 | B1* | 10/2011 | Glade et al. .................. 711/114 |
| 8,046,535 | B2 | 10/2011 | Shibayama et al. |
| 8,244,868 | B2* | 8/2012 | La Frese et al. .............. 709/226 |
| 2009/0300285 | A1 | 12/2009 | Nagai et al. |

FOREIGN PATENT DOCUMENTS

JP    2007-66259 A    3/2007

* cited by examiner

*Primary Examiner* — Tuan Thai
(74) *Attorney, Agent, or Firm* — Mattingly & Malur, PC

(57) ABSTRACT

The virtual volume is a virtual logical volume that conforms to Thin Provisioning, and is a logical volume configured from a plurality of virtual areas and used by a plurality of applications. In a case where the storage apparatus receives a write request comprising write-destination information for identifying a write-destination virtual area in the virtual volume, and, in addition, the write-destination virtual area is an unallocated virtual area, the storage apparatus selects a medium, which corresponds to the write to the write-destination virtual area and/or the identification information of the source of this write, from a plurality of media, which have different performances and which are each configured from two or more real areas, and allocates a real area from the selected medium to the write-destination virtual area.

10 Claims, 14 Drawing Sheets

| LUN | VVOL ID | LBA RANGE | REAL AREA ID | Tier ID | ACCESS-SOURCE WWN AT ALLOCATION | ALLOCATION TIME | ACCESS FREQUENCY | REALLOCATION DETERMINATION RESULT |
|---|---|---|---|---|---|---|---|---|
| LUN 1 | Volume 1 | 0-999 | SEG 1 | Tier 2 | WWN-A | 2009/12/25 13:45 | 120 | Tier 1 |
| | | 1000-1999 | SEG 4 | Tier 2 | WWN-A | 2009/12/25 21:34 | 5 | Tier 3 |
| | | 2000-2999 | SEG 7 | Tier 2 | WWN-B | 2009/12/25 15:00 | 150 | Tier 1 |
| LUN 2 | Volume 2 | 0-999 | SEG 2 | Tier 1 | WWN-C | 2009/12/25 18:43 | 50 | Tier 2 |
| LUN 3 | Volume 3 | 0-999 | SEG 3 | Tier 1 | WWN-D | 2009/12/25 8:35 | 10 | Tier 3 |
| .. | .. | .. | .. | .. | .. | .. | .. | .. |

| REAL AREA ID (601) | ALLOCATION STATUS (602) | RAID GROUP ID (603) | LBA RANGE (604) |
|---|---|---|---|
| SEG 1 | ALLOCATED | RAID Group 1 | 0-999 |
| SEG 2 | ALLOCATED | | 1000-1999 |
| SEG 3 | ALLOCATED | | 2000-2999 |
| SEG 4 | ALLOCATED | RAID Group 2 | 0-999 |
| SEG 5 | UNALLOCATED | | 1000-1999 |
| SEG 6 | UNALLOCATED | | 2000-2999 |
| SEG 7 | ALLOCATED | RAID Group 3 | 0-999 |
| SEG 8 | UNALLOCATED | | 1000-1999 |
| SEG 9 | UNALLOCATED | | 2000-2999 |
| : | : | : | : |

| RAID GROUP ID (701) | PDEV TYPE (702) | RAID LEVEL (703) |
|---|---|---|
| RAID Group 1 | SSD | RAID 5 |
| RAID Group 2 | FC | RAID 5 |
| RAID Group 3 | S-ATA | RAID 0 |
| : | : | : |

| 1001 | 1002 |
|---|---|
| HOSTNAME | WWW |
| Host1 | WWW-A |
|  | WWW-B |
| Host2 | WWW-C |
| : | : |

| 1101 | 1102 | 1103 |
|---|---|---|
| APPLICATION NAME | HOSTNAME | TIME PERIOD |
| App1 | Host1 | 8:00-17:00 |
| App2 | Host2 | 8:00-17:00 |
| : | : | : |

FIG. 12

| VVOL ID (1201) | ACCESS-SOURCE WWN AT INITIAL ALLOCATION (1202) | INITIAL ALLOCATION DATE / TIME (1203) | | TABULATION VALUE (1204) | | | | INITIAL ALLOCATION TIER (1205) |
|---|---|---|---|---|---|---|---|---|
| | | DATE | TIME PERIOD | NO. OF Tier 1s | NO. OF Tier 2s | NO. OF Tier 3s | ... | |
| Volume 1 | WWN-A | 2009/12/25 | 9:00–10:00 | 15 | 4 | 1 | ... | Tier 1 |
| | | | 10:00–11:00 | 20 | 5 | 3 | ... | Tier 1 |
| | | | 11:00–12:00 | 24 | 2 | 1 | ... | Tier 1 |
| | | | 12:00–13:00 | 5 | 19 | 4 | ... | Tier 2 |
| | | .. | .. | .. | .. | .. | .. | .. |
| | WWN-B | 2009/12/25 | 9:00–10:00 | 22 | 3 | 0 | ... | Tier 1 |
| | | | 10:00–11:00 | 31 | 4 | 2 | ... | Tier 1 |
| | | | 11:00–12:00 | 27 | 2 | 3 | ... | Tier 1 |
| | | | 12:00–13:00 | 3 | 22 | 3 | ... | Tier 2 |
| | | .. | .. | .. | .. | .. | .. | .. |
| | WWN-C | 2009/12/25 | 9:00–10:00 | 2 | 13 | 4 | ... | Tier 2 |
| | | | 10:00–11:00 | 4 | 15 | 2 | ... | Tier 2 |
| | | | 11:00–12:00 | 4 | 18 | 3 | ... | Tier 2 |
| | | | 12:00–13:00 | 1 | 2 | 13 | ... | Tier 3 |
| | | .. | .. | .. | .. | .. | .. | .. |
| .. | .. | | | | | | | |

INITIAL ALLOCATION POLICY DEFINITION

CURRENT DEFINITION

1701

| HOST NAME | APPLICATION NAME | VVOL ID | ACCESS-SOURCE WWN | TIME PERIOD | INITIAL ALLOCATION Tier |
|---|---|---|---|---|---|
| Host 1 | Application 1 | Volume 1 | * | * | Tier 2 |
| Host 2 | Application 2 | | | | |
| : | : | Volume 2 | * | * | Tier 1 |
| | | Volume 3 | * | * | Tier 3 |
| | | : | : | : | : |

RECOMMENDED DEFINITION

1703

| HOST NAME | APPLICATION NAME | VVOL ID | ACCESS-SOURCE WWN | TIME PERIOD | INITIAL ALLOCATION Tier | |
|---|---|---|---|---|---|---|
| Host 1 | Application 1 | Volume 1 | WWN-A, WWN-B | 9:00-12:00 | Tier 1 | ☑ |
| | | Volume 1 | WWN-A, WWN-B | 12:00-13:00 | Tier 2 | ☐ |
| Host 2 | Application 2 | Volume 1 | WWN-C | 9:00-12:00 | Tier 2 | ☐ |
| | | Volume 1 | WWN-C | 12:00-13:00 | Tier 3 | ☐ |
| : | : | : | : | : | : | ☐ |

1706 1705

[DETAILS] [APPLY]

METHOD FOR CONTROLLING DATA WRITE TO VIRTUAL LOGICAL VOLUME CONFORMING TO THIN PROVISIONING, AND STORAGE APPARATUS

CROSS-REFERENCE TO PRIOR APPLICATION

This application is a continuation of U.S. patent application Ser. No. 12/852,563, filed Aug. 9, 2010, which relates to and claims the benefit of priority from Japanese Patent Application number 2010-94059, filed on Apr. 15, 2010 the entire disclosure of which is incorporated herein by reference.

BACKGROUND

The present invention relates to the allocation of a storage area to a virtual logical volume that conforms to Thin Provisioning.

Storage tier management technology that combines Thin Provisioning technology is known. In this storage tier management technology, the medium from which a real area (a substantive storage area) is allocated is selected using a virtual logical volume (hereinafter, a virtual volume) unit that conforms to Thin Provisioning. For example, according to Japanese Patent Application Laid-open No. 2007-66259, one or more media are associated beforehand with each virtual volume, and when there is a write to the virtual volume, a real area is allocated from any of the one or more media associated with this virtual volume.

SUMMARY

There are cases where a single virtual volume is used with a plurality of either applications or host computers, and, in addition, where the performance requirements with respect to the virtual volume will differ for each either application or host computer. For instance, two specific examples of this may be considered.

As a first specific example, a case in which a single virtual volume is used by an online processing application, which must process numerous requests at high speed, a tabulation application, which batch processes the data of this application at night, and a backup application, which regularly creates backups, will be considered. In this case, it is preferable that a real area inside a high-speed medium should be allocated to a virtual area (a virtual storage area inside the virtual volume) used by the online processing application, and real areas inside media that are lower speed than this high-speed medium should be allocated to the virtual areas that are used by the other applications.

However, according to the above-mentioned technology, since the medium that serves as the source of the initially allocated real area is determined in virtual volume units, it is not always possible to allocate an appropriate real area to the virtual volume.

In the first specific example, when the setting is such that initially a real area is always allocated from a high-speed medium, a real area from a high-speed medium is also allocated to a virtual area that is the write destination of an application other than the online processing application. For this reason, over-spec (that is, the allocation of media that are too fast) occurs. By contrast, when the setting is such that initially a real area is always allocated from a low-speed medium, a real area from a low-speed medium is also allocated to a virtual area that is the write destination of the online processing application. For this reason, a performance deficiency occurs with respect to an access from the online processing application.

As a second specific example, host virtualization technology (server virtualization technology) will be considered. In host virtualization technology, a plurality of virtual volumes, which are provided from a storage apparatus, are regarded as a single virtual storage pool called a "data store", and a virtual disk based on the data store is provided to a virtual host. This means that a many-to-many relationship is able to exist between the storage apparatus-provided virtual volume and the virtual disk that is provided to the virtual host, in other words, the storage apparatus-provided virtual volume may be used by a plurality of virtual hosts having different applications.

Accordingly, an object of the present invention is to enable an appropriate medium, which is the source of a real area that is initially allocated to a virtual volume used by a plurality of applications, to be selected for each application, virtual host or host.

The virtual volume is a virtual logical volume that conforms to Thin Provisioning, and is a logical volume configured from a plurality of virtual areas and used by a plurality of applications. In a case where the storage apparatus receives a write request comprising write-destination information for identifying a write-destination virtual area in the virtual volume, and, in addition, the write-destination virtual area is an unallocated virtual area, the storage apparatus selects a medium, which corresponds to the write to the write-destination virtual area and/or the identification information of the source of this write, from a plurality of media, which have different performances and which are each configured from two or more real areas, and allocates a real area from the selected medium to the write-destination virtual area.

BRIEF DESCRIPTION OF THE DRAWINGS

FIG. 4 shows the configuration of a VVOL management table 312;

FIG. 5 shows the configuration of a real area management table 313;

FIG. 6 shows the configuration of a RAID group management table 314;

FIG. 10 shows the configuration of a host management table 317;

FIG. 11 shows the configuration of an application definition table 318;

FIG. 12 shows the configuration of a reallocation log table 412;

FIG. 17 shows an initial allocation policy definition screen 1401; and

DETAILED DESCRIPTION

Figure 1:
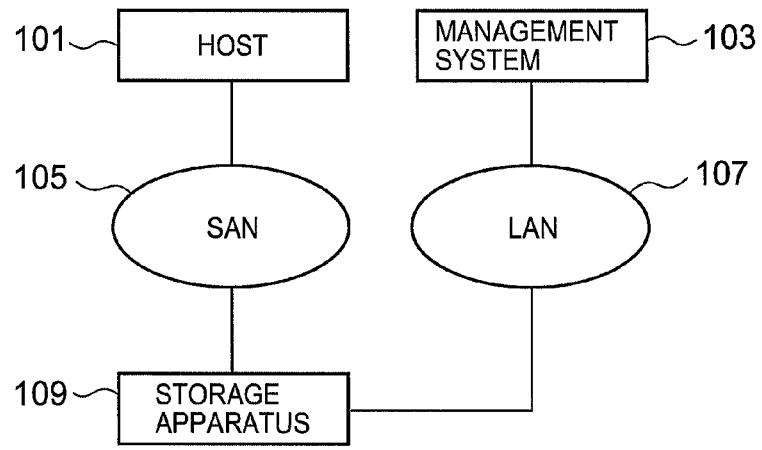
FIG. 1 shows the configuration of a computer system related to one embodiment of the present invention.

An embodiment of the present invention will be explained below. In the following explanations, various types of information may be explained using the expression "xxx table", but these various types of information may be expressed using a data structure other than a table (for example, a queue). To show that the information is not dependent on the data structure, "xxx table" may be called "xxx information".

Further, an ID, a WWN (World Wide Name), and a name will be used as information for identifying various targets in the following explanation, but these are interchangeable and other types of identification information (for example, a number) may be used.

In the following explanation, there may be instances when "program" is used as the subject in explaining a process, but since a prescribed process is performed in accordance with a program being executed by a processor (for example, a CPU (Central Processing Unit)) while using a storage resource (for example, a memory) and/or a communication interface device (for example, a communication port) as needed, the subject of the process may also be the processor. A process that is explained having the program as the subject may be a process that is performed by a management system. The processor may comprise a hardware circuit for processing either all or a portion of the processes performed by the processor. A computer program may be installed in respective computers from a program source. The program source, for example, may be a program delivery server or a storage medium.

A management system may be configured using one or more computers. Specifically, for example, in a case where a management computer displays information, or a case where the management computer sends display information to a remote computer, the management computer is the management system. Further, for example, in a case where the same functions as those of the management computer are realized by a plurality of computers, this plurality of computers (may include a display computer in a case where the display computer carries out displays) is the management system.

Further, date information may be included in a "time" stated in the present invention. In addition, the format for expressing "time" data may be expressed as the number of seconds, milliseconds, and microseconds from a predetermined starting point, may be expressed in the format year, month, day, hour, minute and second, or may be expressed using another format. Further, the "time" may refer to a specific point-in-time, and may possess duration as in a time period.

In the present invention, "application" refers to a series of either virtual host- or host-performed operations, which are stipulated in accordance with the following (A) and (B):

(A) one or more application programs; and (B) at least one of (b1) setting information of this program, (b2) data targeted for processing by this program, (b3) content of the processing request received by his program, and (b4) frequency with which this program receives a processing request. One example thereof is the above-mentioned online processing, tabulation processing or backup processing. Furthermore, (*) As examples in which having the same type of application program and different processing-targeted data leads to a difference in the series of operations, there is a case in which the application program is a DBMS program, and the processing-targeted data is mission-critical data that is actually being operated on, and a case in which the processing-targeted data is data for analysis use.

(*) Examples in which a portion of the types of application programs are the same and the processing-targeted data is also the same, but the content of the processing request received by this program differs are the above-mentioned online processing, tabulation processing and backup processing.

Overview of This Embodiment

Figure 18:
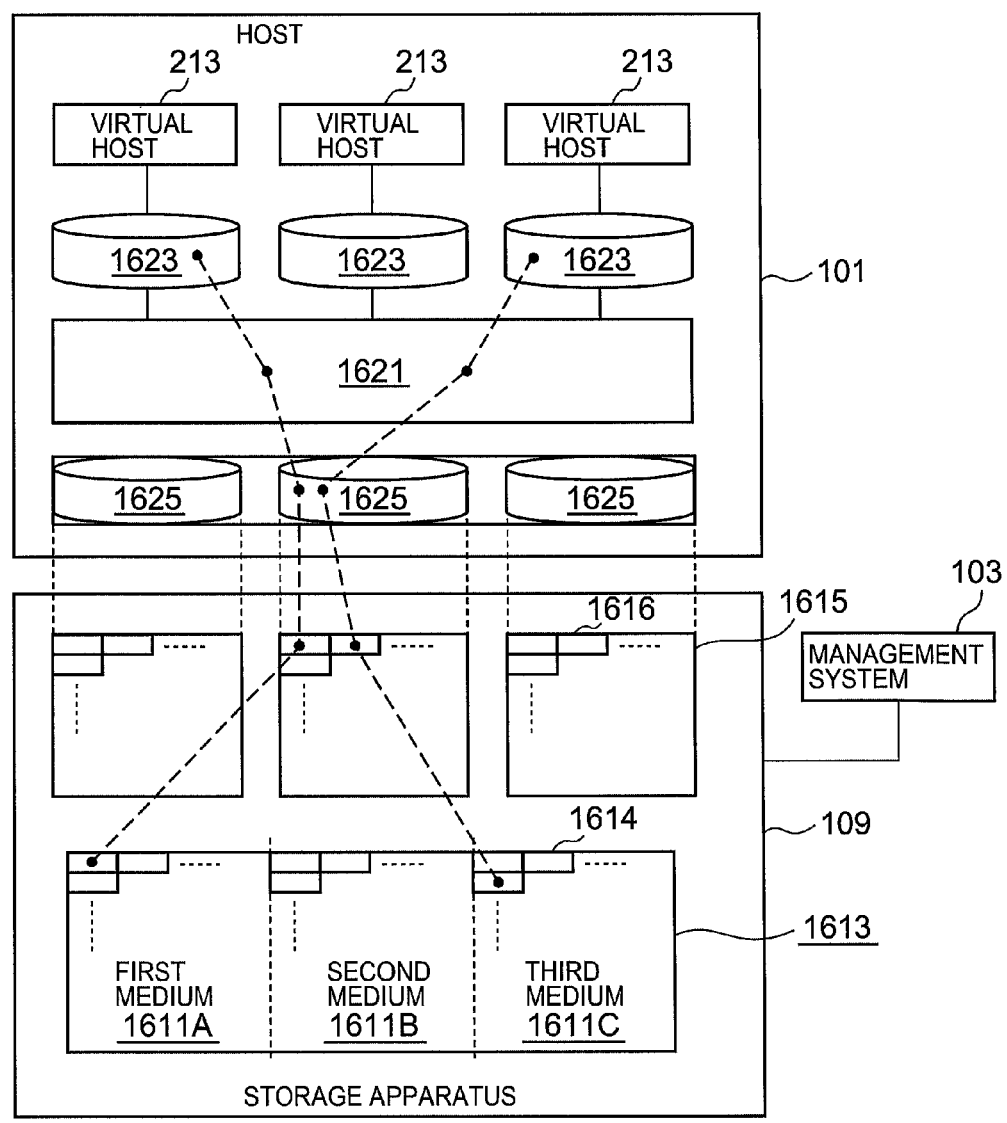
FIG. 18 is a schematic diagram showing an overview of one embodiment of the present invention.

FIG. 18 is a schematic diagram showing an overview of one embodiment of the present invention.

A host computer (hereinafter, simply called the host) 101 and a management system 103 are coupled to a storage apparatus 109.

The management system 103 manages the storage apparatus 109. The management system 103 may also comprise either the storage apparatus 109 or the host 101.

The storage apparatus 109 comprises a pool 1613 and a plurality of virtual volumes (hereinafter, VVOL) 1615.

The pool 1613 is configured from a plurality of tiers. In other words, the pool 1613 is configured from a plurality of media 1611 having different performances. The tier height depends on the performances of the media 1611. For example, a first medium (the fastest medium) 1611A, which has the highest performance among the plurality of media 1611, is equivalent to the highest tier, and a third medium (the slowest medium) 1611C, which has the lowest performance among the plurality of media 1611, is equivalent to the lowest tier. As used here, "performance", for example, is access performance. Access performance, for example, includes response time (for example, the time it takes a medium-based physical storage device to output a response to a controller after receiving a data access request from the controller) and a data transfer rate (the amount of data inputted/outputted per unit of time).

Each medium 1611 is configured from two or more real areas 1614. Therefore, the pool 1613 is configured from a plurality of real areas (substantive storage areas) 1614. Each medium 1611 is a cluster of one or more real volumes based on one or more physical storage devices (for example, a RAID (Redundant Array of Independent (or Inexpensive) Disks) group, which is configured from a plurality of physical storage devices). A "real volume" is a logical volume based on a physical storage device. The performance of a medium 1611 depends on at least one of the type of physical storage device that forms the basis for this medium 1611, a RAID level or a RAID combination (a configuration like 4D+2P or 3D+1P). As types of physical storage devices, for example, there are a SSD (Solid State Drive), a SAS (Serial Attached SCSI)-HDD (Hard Disk Drive), and SATA (Serial ATA)-HDD. Furthermore, SSD differs from a HDD in that it is a physical storage device that uses a semiconductor memory, such as a flash memory or DRAM.

The VVOL 1615 is configured from a plurality of virtual areas (virtual storage areas) 1616.

Host virtualization technology (server virtualization technology) is applied to the host 101. The host 101 comprises a plurality of virtual hosts 213 and a data store 1621. The data store 1621 is a cluster of a plurality of mounted volumes 1625. The mounted volume 1625 is a storage space that corresponds to a VVOL 1615 that is mounted from the storage device 109. The mounted volume 1625 and the VVOL 1615 correspond to each other on a one-to-one basis. One part of the data store 1621 is provided to a virtual host 213 as a logical volume 1623. In accordance with a configuration like this, a many-to-many relationship is able to exist between the VVOL 1615 and the logical volume 1623, in other words, the VVOL 1615 is able to be used by a plurality of virtual hosts 213 having different applications.

Furthermore, "mounted" indicates at the least that the host 101 recognizes the VVOL 1615 and creates management information required for creating the data store 1621. In addition, as an example of the above-mentioned management information, there is the correspondence between the VVOL 1615 identifier and the identifier allocated for the host 101 to manage the VVOL 1615. Examples of VVOL 1615 identifiers may include (1) the storage apparatus identifier and a unique identifier inside the storage apparatus that is allocated to the VVOL 1615, and (2) a port identifier (for example, at least one of a WWN, a port ID, and an IP address) of the storage apparatus and a LUN (Logical Unit Number) allocated to the VVOL 1615. In the following explanation, the host 101 will be explained using the term "VVOL 1615", but this explanation is about the VVOL 1615, that is, the mounted volume 1625 that is recognized by the host 101.

The allocation of a real area to the virtual area 1616 includes an "initial allocation" and an "allocation in reallocation".

The "initial allocation" is to allocate an unallocated real area (a real area that is not allocated to any virtual area 1616) 1614 to an unallocated virtual area 1616. Therefore, the "initial allocation" may be carried out upon receiving a write request that specifies an address range (for example, a LBA (Logical Block Address) and a write data length), which comprises this unallocated virtual area inside the VVOL. Further, the "initial allocation", for example, may also be carried out when a migration of data from a VVOL 1615 to another VVOL 1615 triggers the need to store data in this unallocated virtual area. Furthermore, in the above explanation, the real area to be allocated is assumed to be an unallocated area at the time of allocation to the virtual area, but this does not always have to be so. That is, an area that has already been allocated to another virtual area may be allocated to the unallocated virtual area at allocation time.

An "unallocated virtual area" is either a virtual area to which a real area is not allocated, or a virtual area to which a real area is not substantially allocated (for example, a virtual area to which a special real area with prescribed data (for example, a real area in which the value of all the bits is "0") is allocated). In a case where a write occurs to an unallocated virtual area, and a special real area is allocated to this virtual area, an unallocated real area (a real area that is not allocated to a virtual area) is allocated to this virtual area in place of the special real area, and the write data is written to this real area. There may be n (where n is a natural number) special real areas in a single pool. Further, a special real area may be shared by a plurality of unallocated virtual areas.

The "allocation in reallocation" is when, in a reallocation process, a data migration-destination real area 1614 is allocated in place of a migration-source real area 1614 to a virtual area 1616 to which the data migration-source real area 1614 has been allocated. In this embodiment, an appropriate medium 1611 is selected as the source of the real area that is allocated at the initial allocation as described above. Furthermore, in the case of an "allocation in reallocation", it is typical for data stored in the migration-source real area 1614 to be moved (or copied) to the migration-destination real area.

In a write from a virtual host 213, for example, the following (a1) through (a7) are carried out.

(a1) A program, which is virtually executed by the virtual host 213, requests a write to a virtual disk (called the virtual host disk) 1623 that is provided to this virtual host 213. The write request at this time specifies a range of addresses (the virtual host disk address range) on the virtual host disk 1623. Furthermore, in the case of a write request, the virtual host 213 also creates write-targeted data (write data). The virtual host 213 is a virtual computer provided in accordance with the host 101 processing a hypervisor program, and similarly the operating host disk is a virtual disk that is provided to the program, which is being virtually executed on the virtual host, in accordance with processing the hypervisor program.

(a2) The hypervisor program of the host 101 sends the write request and write data that specify the address range of the VVOL 1615 corresponding to the virtual host disk address range (for example, the LBA (Logical Block Address) and the write data length) to the storage apparatus 109 in response to the request of (a1).

(a3) The storage apparatus 109 receives the write request sent in (a2). The storage apparatus 109 comprises a cache memory area, and stores the write data that conforms to the write request in the cache memory area. When the write data is written to the cache memory area, the storage apparatus 109 may respond to the host 101 with a write-complete report.

(a4) The storage apparatus 109 identifies from the write request-specified address range received in (a3) a virtual area (hereinafter, the write-destination virtual area) 1616 included in this address range.

(a5) The storage apparatus 109 determines whether or not the write-destination virtual area 1616 is an unallocated virtual area.

(a6) In a case where the write-destination virtual area 1616 is an unallocated virtual area, the storage apparatus 109 carries out an initial allocation process. In the initial allocation process, the storage apparatus 109 identifies a medium 1611 that corresponds to the write-source application, the host 101, or the virtual host 213, and allocates an unallocated real area 1614 from the identified medium 1611 to the write-destination virtual area 1616.

(a7) The storage apparatus 109 writes the write-targeted data to the real area 1614 that has been allocated to the write-destination virtual area 1616. The storage apparatus 109 may respond to the host 101 with a write-complete report when the write-targeted data has been written to the real area 1614 instead of when the write-targeted data has been written to the cache memory area.

On the other hand, in a read from a virtual host 213, for example, the following (A1) through (A5) are carried out.

(A1) A program, which is virtually executed by the virtual host 213, requests a read with respect to the virtual host disk 1623 that is provided to this virtual host 213. The read request at this time specifies the virtual host disk address range.

(A2) The host 101 hypervisor program sends the read request specifying the address range of the VVOL 1615 corresponding to the virtual host disk address range to the storage apparatus 109 in response to the request of (A1).

(A3) The storage apparatus 109 receives the read request sent in (A2). The storage apparatus 109 specifies the address range specified in the read request, reads data that was written in the past (called the read-targeted data or the read data) from either the cache memory area or an allocated real area, and sends this data to the host 101.

(A4) The host 101 hypervisor program receives the above-mentioned read data, identifies the virtual host that requested the read in (A1), and virtually sends the read data to this virtual host.

(A5) A program, which is virtually executed by the virtual host, receives the read data of (A4) as read data that corresponds to the requested read.

Examples of the "program, which is virtually executed by the virtual host" in the above explanation are an OS and an application program. Furthermore, the above explanation that has the "storage apparatus" as the subject may be considered a process, which is carried out by a controller that is included in the storage apparatus.

Furthermore, the process in which the address range in the virtual volume 1616 is identified from the virtual disk address range, which is the target of the write and read of the above-mentioned (a2) and (A2), is carried out based on conversion information of the host 101.

The initial allocation process related to this embodiment is based on the concept that the write-source application, virtual host, or host correspond to write-source identification information and/or a write time period.

The write-source identification information is for identifying the write source, and in this embodiment, is the WWN (World Wide Name) of the write-source virtual host 213. In a case where host virtualization technology is not applied (a case in which there are no virtual hosts 213 in the host 101), the write-source identification information may be the host 101 WWN (specifically, the WWN allocated to the interface device (for example, the HBA (Host Bus Adapter)) of the host 101).

The write time period, for example, is the time period to which the write time belongs. The write time, for example, is the time at which the write request was received, the time at which the real area was allocated in response to the write request, or the time displayed by the timestamp of the write request.

As the method for identifying the write-source application, for example, a method in which either the storage apparatus 109 or the management system 103 has an agent program, and the agent program queries the application at the time of the write from the host 101 is conceivable. However, this method is not realistic.

Accordingly, the write-source identification information and/or the write time are used in this embodiment in order to identify the write-source application, virtual host, or host. This is based on at least one of the following plurality of assumptions.

(*) The tendency is to simultaneously execute either one or a small number of application programs in one host 101 (or one virtual host 213), and not to always execute numerous application programs simultaneously.

(*) In addition to the tendency not to execute large numbers of application programs in one host 101 (or one virtual host 213) during overlapping time periods as described above, there are also a case in which another application program will be executed when the time periods are different. That is, there is a tendency for one application program to be executed during a single time period. For example, a first application program is executed in the afternoon, and a second application program is executed at night.

In the case of this method, the storage apparatus 109 is substantially able to identify the write-source application on its own.

Furthermore, in the present invention, the write-source identification information, for example, is either the identifier of the WWN (or a port number created based on the WWN) of the interface device of the write-request source host 101 (or virtual host 213) included in the write request, or information obtained by converting this information.

In this embodiment, initial allocation policy information is prepared beforehand. Based on the initial allocation policy information, the medium 1611 corresponding to the write-source identification information and/or the write time is identified in the above-mentioned (a6).

In the initial allocation policy information, first a medium (hereinafter, the initial medium) 1611, which will become the source of the real area, is defined in VVOL 1615 units. Then, the initial allocation policy information is updated in a timely manner based on the result of the reallocation process. In the reallocation process, a data migration is performed between real areas 1614. The real area 1614, which has been allocated to the virtual area 1616, becomes the migration-source real area 1614, and a real area 1614 inside a medium 1611 that differs from the medium 1611 comprising this real area 1614 becomes the migration-destination real area 1614. In the reallocation process, whether or not the real area 1614 that has been allocated to the virtual area 1616 becomes the target of the data migration is determined on the basis of the access status of this virtual area 1616. The above-mentioned "access" includes the above-described read and/or write. The access status, for example, may be the last access time (the last write time and/or the last read time) or the access load. The access load, for example, may be either the data transfer rate (the amount of data inputted/outputted per unit of time), or the access frequency. In this embodiment, whether or not the real area 1614 that has been allocated to the virtual area 1616 becomes the target of the data migration is determined on the basis of the access frequency of this virtual area 1616. Specifically, in this embodiment, for example, the following (Item 1) and (Item 2) are for the reallocation process.

(Item 1) An access frequency range is defined for either each medium 1611 or each tier.

(Item 2) The storage apparatus 109 manages the access frequency (for example, the unit "IOPS") for each virtual area 1616. For example, when a write and/or read is carried out with respect to the virtual area 1616 (or, when a write and/or read is carried out with respect to the real area that is allocated to the virtual area 1616), the storage apparatus 109 updates the access frequency corresponding to this virtual area 1616. The storage apparatus 109 either regularly or repeatedly sets the access frequency for each virtual area 1616 to zero, for example.

In the above items, the access frequency is used as an example, but a range of access statuses assumed for either each medium 1611 or each tier may be defined using another access status, and the storage apparatus 109 may manage the access status for each virtual area 1616.

The reallocation process is carried out either regularly or irregularly. In the reallocation process, for example, the following (b1) and (b2) are carried out.

(b1) The storage apparatus 109 determines whether or not the access frequency of the virtual area 1616 exceeds the access frequency range corresponding to the medium 1611 comprising the real area 1614 that has been allocated to this virtual area 1616 for each virtual area 1616. In the case of another access status, this process determines whether or not the access status of each virtual area 1616 falls outside the range of the assumed access status range corresponding to the medium 1611 comprising the real area 1614 that has been allocated to this virtual area 1616.

(b2) For a virtual area (hereinafter, called the "target virtual area" in the explanation that refers to FIG. 18) 1616 for which the result of the determination of the above-mentioned (b1) is that the access status falls outside of the range, the storage apparatus 109 carries out the data migration process. Specifically, the following (b21) and (b22) are carried out.

(b21) The storage apparatus 109 migrates data from a migration-source real area to an arbitrary unallocated real area (a migration-destination real area) inside a different medium 1611 than the medium 1611 that comprises this migration-source real area. The "migration-source real area" is the real area that has been allocated to the target virtual area 1616. The medium 1611 that comprises the migration-destination real area is the medium 1611 corresponding to the access frequency range into which the frequency range of the target virtual area 1616 falls. In the case of another access status, the medium 1611 that comprises the migration-destination real area will be the medium 1611 corresponding to the assumed access status range within which the access status of the target virtual area 1616 falls.

(b22) The storage apparatus 109 allocates the migration-destination real area to the target virtual area 1616 in place of the migration-source real area.

The management system 103, based on the result of the reallocation process, updates the initial allocation policy information. For example, in the following case, the management system 103 updates the initial allocation policy information such that the medium, which corresponds to a first write-source identification information and/or a first write time period, transitions from the first medium (for example, a SSD medium) 1611A to the second medium (for example, a SAS medium) 1611B.

(*) The medium, which corresponds to the first write-source identification information and/or the first write time period, is the first medium 1611A. Then, as a result of reallocation, most of the plurality of real areas that have been allocated in the initial allocation process to a plurality of virtual areas corresponding to the first write-source identification information and/or the first write time period are real areas that are included in the second medium 1611B.

Detailed Explanation of the Embodiment

<<Explanation of the Configuration>>

FIG. 1 shows the configuration of a computer system related to this embodiment.

The host 101 and the storage apparatus 109 are coupled to a SAN (Storage Area Network) 105. The storage apparatus 109 and the management system 103 are coupled to a LAN (Local Area Network) 107. At least one of the storage area network 105 and the network 107 for management use may be a different type of communication network. The storage area network 105 and the network 107 for management use may be the same type of network, and may be integrated together.

The host 101 sends an access request to the storage apparatus 109. The storage apparatus 109 receives the access request from the host 101 via the SAN 105, and processes this access request. An example of the access request is the above-mentioned read request and/or write request.

The management system 103 sends a control request (for example, an initial allocation policy information update request) to the storage apparatus 109. The storage apparatus 109 receives the control request from the management system 103 via the LAN 107, and carries out processing in accordance with the control request.

Furthermore, the computer system may comprise a plurality of hosts 101. Similarly, the computer system may comprise a plurality of storage apparatuses 109.

Figure 2:
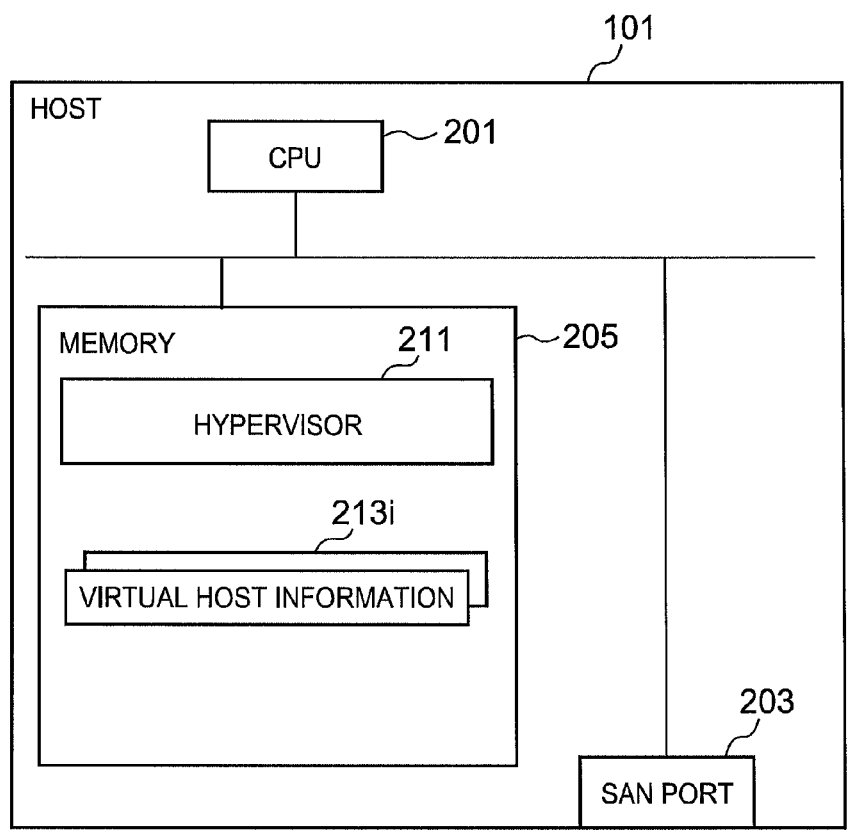
FIG. 2 shows the configuration of a host 101.

FIG. 2 shows the configuration of the host 101.

The host 101 is configured from one or more computers. The host 101 comprises a SAN port 203, a memory 205, and a CPU (Central Processing Unit) 201, which is coupled to the memory 205 and the SAN port 203. Another type of storage resource may be used either instead of or in addition to the memory 205.

The SAN port 203 is coupled to the SAN 105, and, for example, a WWN, which is the identification information of the SAN port 203, is allocated to the SAN port 203 of the HBA (Host Bus Adapter) built into the host 101.

The memory 205 stores the above-mentioned hypervisor program 211 (may be abbreviated as hypervisor), and one or more virtual host information 213i. The hypervisor 211 is a computer program for host virtualization. One or more virtual hosts (virtual computers) 213 are run on the host 101 in accordance with the hypervisor 211 being executed by the CPU 201 based on the above-mentioned virtual host information.

Each virtual host 213 carries out communications using the SAN port 203. A virtual WWN, which is the identification information of the virtual port, is allocated to each virtual host 213. An access request from the virtual host 213, for example, comprises the virtual WWN and access-destination information. The access destination information is for identifying the access-destination area, and, for example, comprises a LUN (Logical Unit Number) and a LBA (Logical Block Address). It is possible to identify the access-destination VVOL from the LUN and to identify the virtual area inside this VVOL from the LBA. The access request from the virtual host 213 is outputted via the SAN port 203, and reaches the storage apparatus 109 via the SAN 105.

The virtual host information 213i is information that stores the setting content of the virtual host, and an example of the setting content is the above-mentioned virtual WWN and/or the capacity of the virtual host disk.

The access-destination information may also comprise information (for example, a WWN and/or a port number) for identifying either the storage apparatus or the port thereof.

Figure 3:
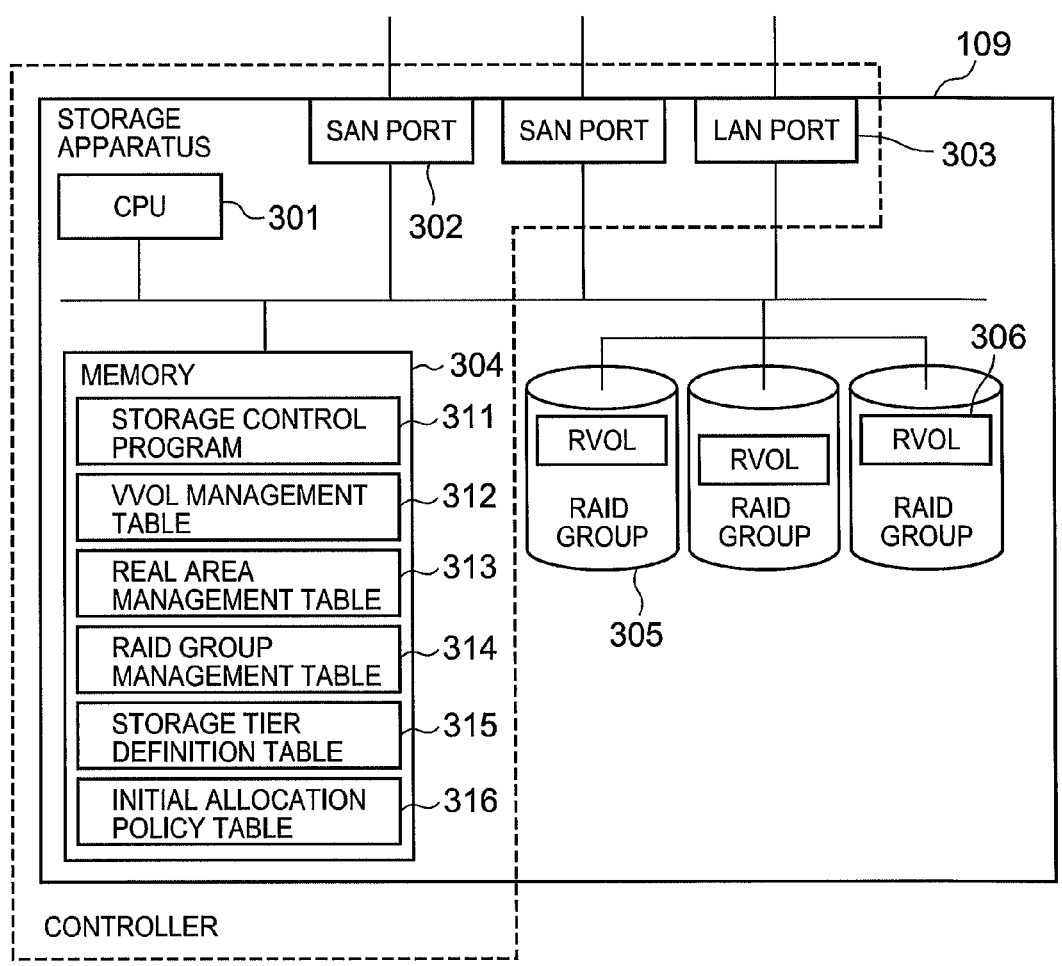
FIG. 3 shows the configuration of a storage apparatus 109.

FIG. 3 shows the configuration of the storage apparatus 109.

The storage apparatus 109 comprises a plurality of RAID groups 305 of different performance, and a controller, which is coupled to the plurality of RAID groups 305, and which controls access to a RAID group 305.

The RAID group 305 is configured from a plurality of the same type of physical storage devices. For example, as the RAID group 305 there may be a RAID group configured from SSD, a RAID group configured from SAS-HDD, and a RAID group configured from SATA-HDD. Various physical storage devices may be used as the physical storage device, such as a HDD and a flash memory device. Furthermore, the above-mentioned coupling of the controller and the RAID group 305 actually refers to the coupling of the controller and the physical storage device.

A logical volume, that is, a real volume (hereinafter, RVOL) 306 which is based on the RAID group 305, is provided. One medium is configured from one or more RVOL 306 that are based on the RAID group 305 of the same performance. The performance of the medium depends on the performance of the RAID group 305 on which the RVOL 306 configuring this medium is based. The performance of the RAID group 305, for example, depends on at least one of the type of physical storage device (the type of physical storage device that configures the RAID group 305), the RAID level and the RAID combination (a configuration like 4D+2P or 3D+1P).

The medium is a component of a pool. For this reason, the medium is configured from two or more real areas. Therefore, the pool is configured from a large number of real areas. One or a plurality of pools may exist in a single storage apparatus. Further, there may be a real volume that does not belong to any pool.

The controller comprises a SAN port 302, a LAN port 303, a memory 304, and a CPU 301 that is coupled to these elements. Another type of storage resource may be used either instead of or in addition to the memory 304. The memory 304 also comprises a cache memory area. Either read data or write data for the RAID group 305 is temporarily stored in the cache memory area.

The SAN port 302 is coupled to the SAN 105. The SAN port 302 receives an access request from the virtual host 213.

The LAN port 303 is coupled to the LAN 107. The LAN port 303 receives a control request from the management system 103.

The memory 304 stores a storage control program 311, a VVOL management table 312, a real area management table 313, a RAID group management table 314, a storage tier definition table 315, and an initial allocation policy table 316. The storage control program 311 is able to carry out an access control process and a reallocation process in accordance with being executed by the CPU 301.

The storage apparatus in the present invention may be of any packaging mode as long as it includes a controller and a physical storage device. For example, the storage apparatus may be a single apparatus as shown in FIG. 3, or the mode may be such that the controller and the physical storage device are in separate apparatuses and are coupled to one another via a network. In the explanation that follows, the storage apparatus may also be called a storage subsystem. Further, in a case where a portion of the processes carried out by the controller is made to be performed by a host computer, this host computer may also be considered to be a part of the storage subsystem.

Next, the tables 312 through 316 will be explained.

FIG. 4 shows the configuration of the VVOL management table 312.

The VVOL management table 312 denotes which real area is allocated to which virtual area of the VVOL, denotes the access-source WWN of the write that triggers the allocation of a real area to the virtual area in the initial allocation process and when it occurs, and denotes the medium from inside which the real area has been allocated to the virtual area in the reallocation process. Specifically, for example, the VVOL management table 312 comprises the following information for each virtual area.

(*) A LUN 500 denoting the LUN corresponding to the VVOL that comprises the virtual area. The LUN is the VVOL identification information that is specified from the host 101.

(*) A VVOL ID 501 denoting the ID of the VVOL that comprises the virtual area. The VVOL ID is not the ID that is specified from the host 101, but rather is the ID that is recognized on the inside of the storage apparatus 109.

(*) A LBA range 502, which is information denoting the address range (may be case hereinafter where this address range is called the LBA range) of the virtual area in the VVOL that comprises the virtual area.

(*) A real area ID 503 denoting the ID of the real area that is allocated to the virtual area.

(*) A tier ID 504 denoting the ID of either the tier or the medium that comprises the real area that is allocated to the virtual area.

(*) An access-source WWN at allocation 505 denoting the access-source identification information of the access (write) that caused the real area to be allocated to the virtual area in the initial allocation process.

(*) An allocation time 506, which is information denoting the time at which the real area was allocated to the virtual area in the initial allocation process.

(*) An access frequency 507, which is information denoting the access frequency of the virtual area. The access frequency unit, for example, is IOPS (number of accesses (I/O) per second). This information may be the access status mentioned above.

(*) A reallocation determination result 508 denoting the ID of either the tier or the medium that comprises the real area that was allocated to the virtual area in the reallocation process.

According to table 312 of FIG. 4, it is clear that a real volume "SEG 1" is allocated to the virtual area "0-999" of VVOL "Volume 1". It is also clear that the real area inside the medium "Tier 2" is allocated to this virtual area "0-999", and that the data inside this real area will be migrated to the real area inside the medium "Tier 1" by a reallocation process. Also, it is clear that the real area was allocated at 13:45 on Dec. 25, 2009 in an initial allocation process that was triggered by a write from the virtual host "WWN-A" to this virtual area "0-999". It is also clear that the access frequency of this virtual area "0-999" is "120".

In the example of FIG. 4, the LBA range of an unallocated virtual area is not registered. However, an unallocated LBA range may be registered by placing NULL values showing that values do not exist in items 503 through 508. Further, the VVOL management table 312 may also be configured from a plurality of tables. For example, a table that extracts only items 500 through 503 may be stored in a separate memory 204, and this separate table may be either referenced or updated in a read-request process or a write-request process.

FIG. 5 shows the configuration of the real area management table 313.

The real area management table 313 denotes whether or not a real area is unallocated. Specifically, for example, the real area management table 313 comprises the following information for each real area.

(*) A real area ID 601 denoting the ID of the real area.

(*) An allocation status 602 denoting whether a real area is allocated or unallocated.

(*) A RAID group ID 603 denoting the ID of the RAID group that is the basis of the real area.

(*) A LBA range 604 denoting LBA range of the target real area in the storage space of the RAID group that is the basis of the real area.

FIG. 6 shows the configuration of the RAID group management table 314.

The RAID group management table 314 comprises information related to the performance of the RAID group. Specifically, for example, the RAID group management table 314 comprises the following information for each RAID group.

(*) A RAID group ID 701 denoting the ID of the RAID group.

(*) A PDEV type 702 denoting the type of the physical storage devices that configure the RAID group.

(*) A RAID level 703 denoting the RAID level of the RAID group.

Another type of information (for example, information denoting the RAID group combination) may be included either instead of or in addition to at least one of the pieces of information 701 through 703 mentioned above. Furthermore, the information in the table shown in the drawing is an example, and this fact is not limited to FIG. 6; the same holds true for the other drawings as well.

Figure 7:
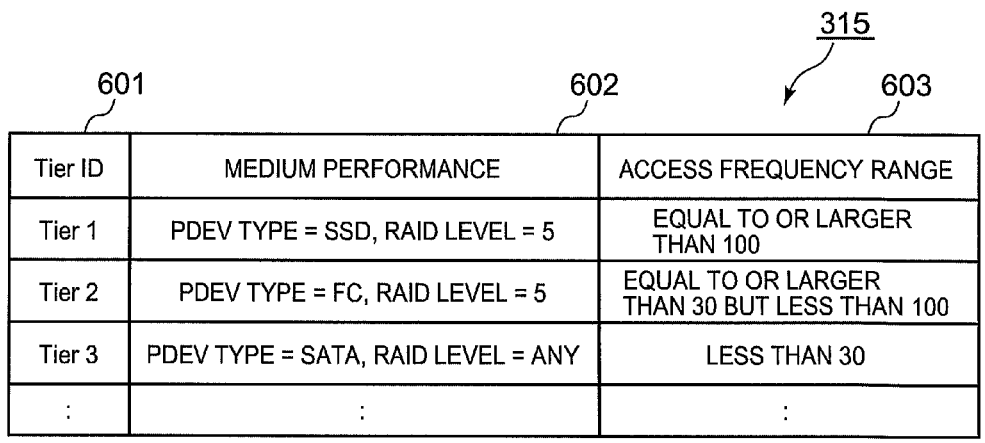
FIG. 7 shows the configuration of a storage tier definition table 315.

FIG. 7 shows the configuration of the storage tier definition table 315.

The storage tier definition table 315 comprises information related to the performance of the medium (tier) and the access frequency range. Specifically, for example, the storage tier definition table 315 comprises the following information for each medium (tier).

(*) A tier ID 801 denoting the ID of the medium (tier).

(*) A medium performance 802 denoting the performance of the medium. The medium performance, for example, is defined in accordance with the type of physical storage devices that configure the RAID group that is the basis of the medium, and the RAID level of this RAID group.

(*) An access frequency range 803 denoting the access frequency range corresponding to the medium (tier). In a case where the access frequency is considered as the access status, this information is the assumed access status range mentioned above.

Figure 8:
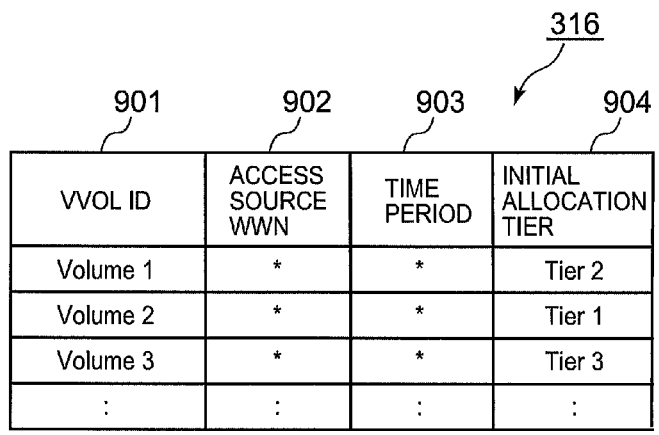
FIG. 8 shows the configuration of an initial allocation policy table 316.

FIG. 8 shows the configuration of the initial allocation policy table 316.

The initial allocation policy table 316 is an example of the above-mentioned initial allocation policy information. The initial allocation policy table 316 denotes either the medium or the tier corresponding to the access-source WWN and the access time period. Specifically, for example, the initial allocation policy table 316 comprises the following information for each access-source WWN and access time period combination.

(*) A VVOL ID 901 denoting the ID of the VVOL.

(*) An access-source WWN 902 denoting the WWN of the access-source virtual host.

(*) A time period 903 denoting a period of time.

(*) An initial allocation tier 904 denoting the ID of the initial medium (tier).

According to the table 316, a combination of an access-source WWN and a time period corresponds to an application. Therefore, determining an initial medium (tier) for each access-source WWN and time period combination determines the initial medium (tier) for each application.

Furthermore, it is possible to set an asterisk value "*", which indicates all cases, for both the access-source WWN 902 and the time period 903. In other words, either the access-source WWN 902 or the time period 903 alone may decide the initial medium. Also, in FIG. 8, the information format makes it possible to define an access-source WWN 902 and a time period 903 for each virtual volume, but these items can also be defined in pool units and storage apparatus units.

Furthermore, in a case where FIG. 8 is used to determine the initial allocation tier based on the VVOL ID, the access-source WWN and/or the time period, the initial allocation tier may first be determined using the row inside the table that does not include the asterisk value in the VVOL ID 901, the access-source WWN 902 and/or the time period 903 of the table of FIG. 8, and in a case where the relevant row does not exist, the initial allocation tier may be determined using a row that includes the asterisk value. In addition, since it is possible to place an asterisk value in the three conditions 901 through 903 in the table of FIG. 8, a priority condition may be determined by placing the priority on the condition having the asterisk value, and taking the relevant condition into account when referencing FIG. 8.

Furthermore, because the initial allocation policy table 316 is referenced in a case where an unallocated virtual area is detected in accordance with a write request, it is preferable that the table size be made as small as possible in order to rapidly determine the initial allocation tier. As a measure for achieving this, a combination of information 901, 902, and 904 for which the current time is included in the time period 903 may be obtained from FIG. 8, a different table (called the access-source-associated initial allocation tier table) may be created, this table may be stored in the memory 304, and this table may be referenced in the process that determines the initial allocation tier. In accordance with this, it becomes necessary to register in the access-source-associated initial allocation tier table a new combination that includes a change in the current time, and by contrast, to carry out processing that excludes the registered combination that no longer includes the current time from the access-source-associated initial allocation tier table. Furthermore, this processing may be carried out by the controller. Further, the table of FIG. 8 may be stored in the memory 402 of the management system, and, in addition, the above-described processing may be carried out by the management system. The specific processing in the case of the latter is as follows.

(*) Either the medium or the tier of the real area to be allocated to the unallocated virtual area is determined by referencing the access-source-associated initial allocation tier table in the process for determining the initial allocation tier.

(*) The controller receives, from the management system, a change request of initially allocated real area setting that specifies the above-mentioned combination (that is, the ID of the virtual volume, the identifier of either the access-source virtual host or the host, and either the initial allocation medium or tier) that is to be either added or deleted, and updates the access-source-associated initial allocation tier table in line with the received contents.

(*) The management system repeatedly executes processing for registering in the access-source-associated initial allocation tier table a new combination that includes the change in the current time, and by contrast, for identifying the combination registered in the access-source-associated initial allocation tier table that no longer includes the current time. Then, in a case where the corresponding combination is detected, the management system sends a change request of initially allocated real area setting specifying the detected combination to the storage apparatus.

Figure 9:
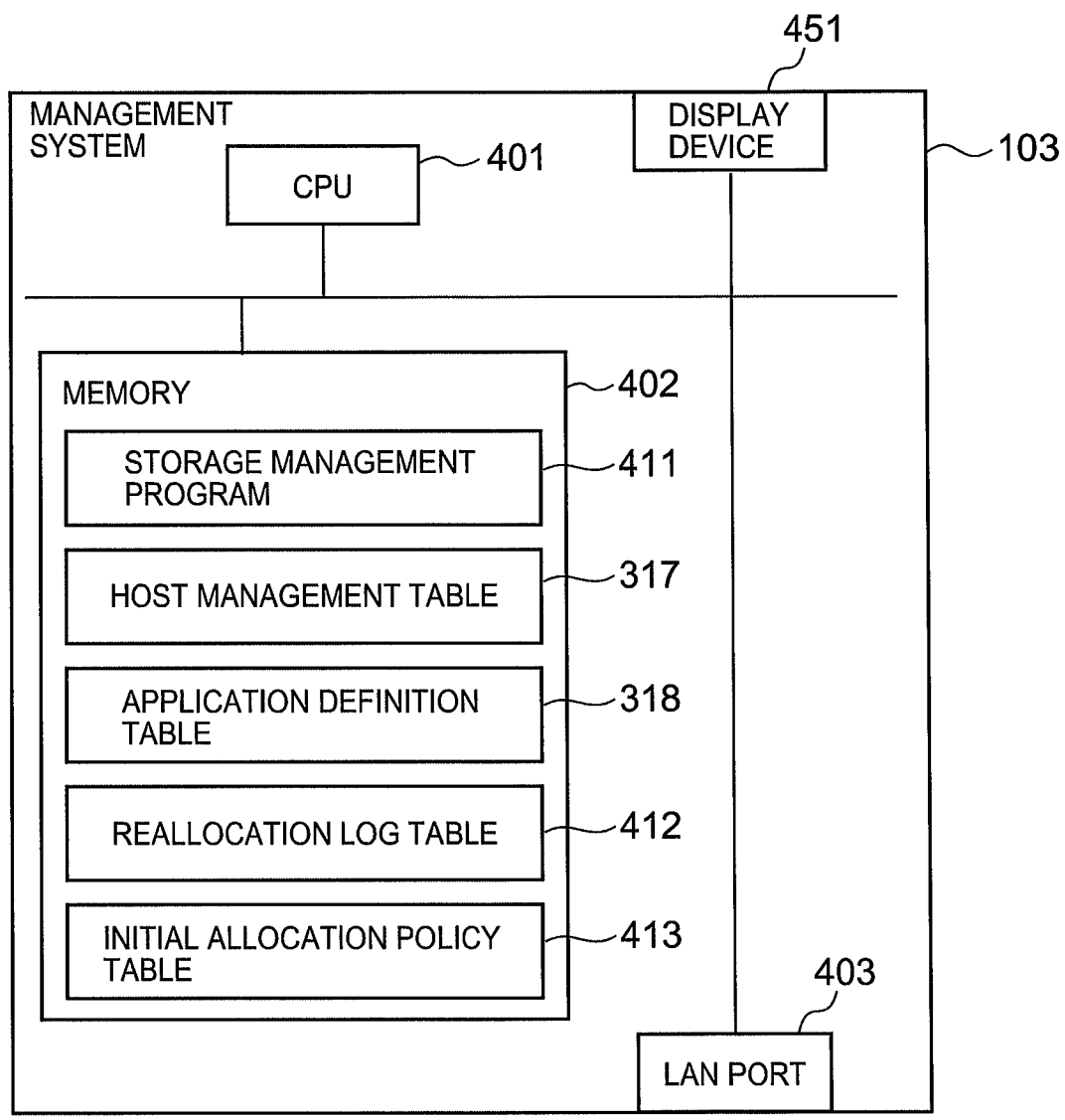
FIG. 9 shows the configuration of a management system 103.

FIG. 9 shows the configuration of the management system 103.

The management system 103 is configured from one or more computers. The management system 103 comprises a LAN port 403, a memory 402, a display device (for example, a liquid crystal display) 451, and a CPU 401 that is coupled to these. Another type of storage resource may be used either instead of or in addition to the memory 402.

The memory 402 stores a storage management program 411, a host management table 317, an application definition table 318, a reallocation log table 412, and an initial allocation policy table 413. The following processing is carried out in accordance with the storage management program 411 being executed by the CPU 401.

(*) The regular or repeated acquiring from the storage apparatus 109 of information denoting the results of reallocation.

(*) The updating of the reallocation log table 412 based on the tabulation of these results.

(*) The carrying out of the initial allocation policy creation process explained below based on the post-update reallocation log table 412.

(*) The reflecting of the result of this creation process in the initial allocation policy tables 413 and 316 either after providing the result to the user and receiving approval from the user, or without providing the result to the user.

The configuration of the initial allocation policy table 413 is the same as the configuration of the initial allocation policy table 316 of the storage apparatus 109. The storage management program 411 updates the initial allocation policy table 316 such that the information of the initial allocation policy table 316 is identical to the information of the post-update initial allocation policy table 413.

FIG. 10 shows the configuration of the host management table 317.

The host management table 317 denotes the relationship between the virtual host and the WWN. Specifically, for example, the host management table 317 comprises the following information for each virtual host.

(*) A hostname 1001 denoting the name of the virtual host.

(*) A WWN 1002 denoting the WWN of the virtual host.

Furthermore, the hostname 1001 and the WWN 1002 can be acquired from a program being executed on the virtual host or from the host hypervisor program, but another acquisition method, such as manual input, may also be used.

FIG. 11 shows the configuration of the application definition table 318.

The application definition table 318 denotes the definition of the application. Specifically, for example, the application definition table 318 comprises the following information for each application.

(*) An application name 1101 denoting the name of the application.

(*) A hostname 1102 denoting the name of the virtual host corresponding to the application (for example, the virtual host on which the application program for this application is to be executed).

(*) A time period 1103 denoting the time period corresponding to the application (for example, the time period during which the application program for this application is to be executed).

The application name, the virtual host on which the application is to be executed, and the time period during which the application is to be executed can be acquired from either the program being executed on the virtual host or from the host hypervisor program, but another acquisition method, such as a manual input, may also be used.

Further, an asterisk value "*", which indicates all cases, may be used in one of the hostname 1102 or the time period 1103 for each application. This signifies that the application definition does not depend on either the virtual host on which the application is to be executed or the time period during which the application is to be executed.

Furthermore, in a case where FIG. 11 is used to determine the application name 1101 based on the hostname and/or the time, the application name may first be determined using the row inside the table that does not include the asterisk value in the hostname 1102 and/or the time period 1103 of the table of FIG. 11, and in a case where the relevant row does not exist, the application name may be determined using a row that includes the asterisk value. In addition, since it is possible to place an asterisk value in the two conditions 1102 and 1103 in the table of FIG. 11, a priority condition may be determined by placing the priority on the condition having the asterisk value, and taking the relevant condition into account when referencing FIG. 11.

FIG. 12 shows the configuration of the reallocation log table 412.

The reallocation log table 412 comprises information denoting a log of the results of reallocation processing. Specifically, for example, the reallocation log table 412 comprises the following information for each combination of an access-source WWN and a time period.

(*) A VVOL ID 1201 denoting the ID of the VVOL.

(*) An initial access-source WWN 1202 denoting the access-source WWN (the WWN of the access-source virtual host) of the access (write) that caused the initial allocation process.

(*) An initial allocation time 1203 denoting the time period that includes the time at which the real area was allocated in the initial allocation process.

(*) A tabulation value 1204 denoting the tabulation of the results of reallocation processing. The tabulation value 1204 specifically denotes how many of the real areas, which have been allocated to the VVOL in accordance with the initial allocation process, are inside which media (tiers).

(*) An initial allocation tier 1205 denoting the ID of the initial medium (tier).

According to the table 412 of FIG. 12, it is clear that there are a plurality of real areas, which were allocated to the VVOL "Volume 1" in the initial allocation process, and that the following results were produced for the plurality of real areas that were allocated from the initial medium "Tier 3" in accordance with a write from the virtual host "WWN-C" during the time period "12:00-13:00 on Dec. 25, 2009" in accordance with reallocation processing carried out subsequent thereto until the present.

(*) The data inside one real area is migrated to one real area inside the medium "Tier 1".

(*) The data inside two real areas are migrated to two real areas inside the medium "Tier 2".

(*) The data inside 13 real areas remains without being migrated from the initial medium "Tier 3".

Taking into account the rate of occurrence of each of the cases mentioned above, it is clear that the medium "Tier 3" is appropriate as the initial medium corresponding to the virtual host "WWN-C" and the time period "12:00-13:00 on Dec. 25, 2009". Therefore, in a case where the value of the initial allocation tier 1205 corresponding to the virtual host "WWN-C" and the time period "12:00-13:00 on Dec. 25, 2009" is something other than "Tier 3", it is preferable that this value to updated to "Tier 3". This is because the amount of data migrated in the reallocation process should be as small as possible.

<<Explanations of Processes Performed by This Embodiment>>

The processes carried out by this embodiment, for example, are (1) the initial setup, (2) the write process, (3) the reallocation process, and (4) the updating of the initial allocation policy table. Each of these processes will be explained hereinbelow.

(1) Initial Setup

Figure 13:
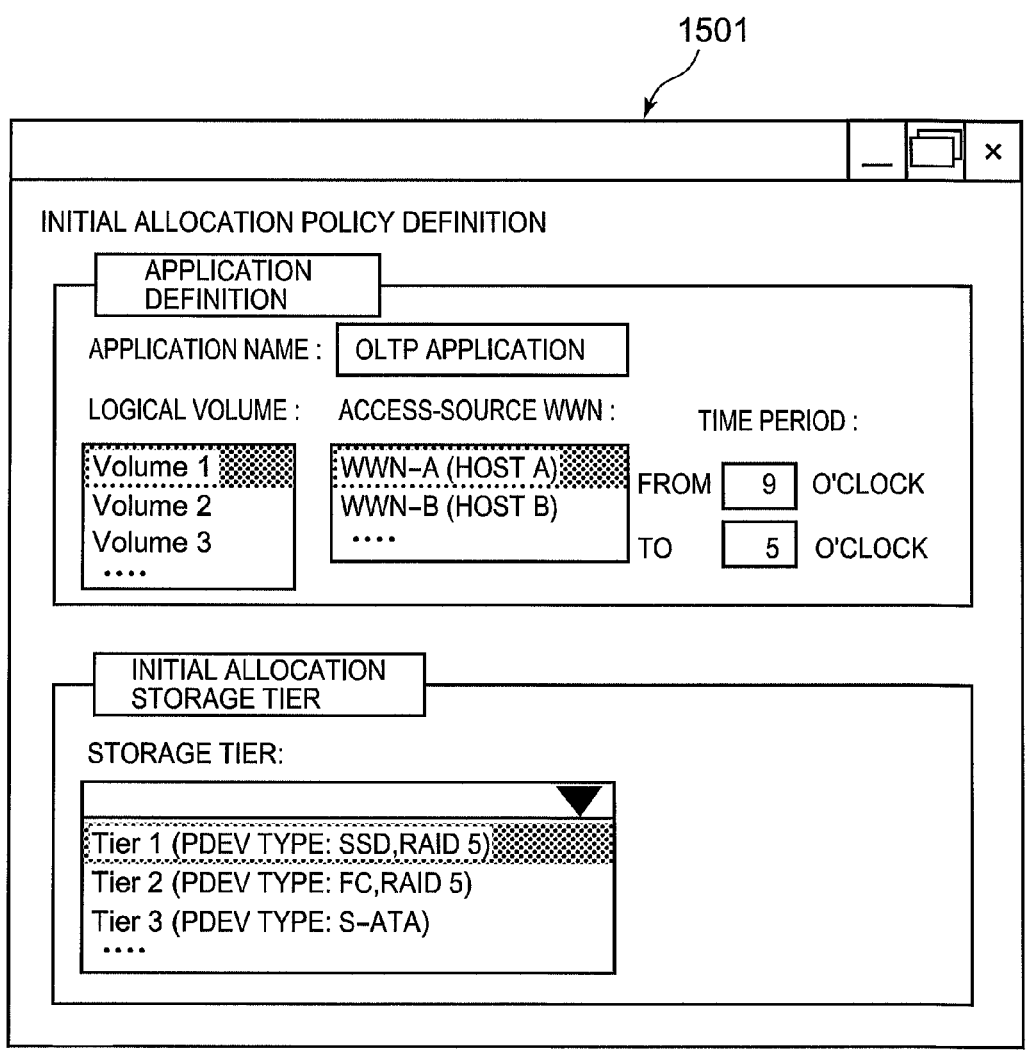
FIG. 13 shows an initial setting screen 1501.

The storage management program 411 inside the management system 103 displays an initial setup screen 1501, an example of which is given in FIG. 13, on the display device 451. An application name and a time period can be inputted via this screen 1501. It is also possible to select a VVOL ID, an access-source WWN and a hostname, as well as the ID of the initial medium (tier) from this screen 1501. For example, a selectable VVOL ID is VVOL ID 501, which is registered in the VVOL management table 312, a selectable access-source WWN and a selectable hostname, for example, are WWN 1002 and hostname 1001, which are registered in the host management table 117, and a selectable initial medium (tier) ID, for example, is ID 801, which is registered in the storage tier definition table 315.

Prior to a VVOL being provided to the host 101 from the storage apparatus 109 (prior to a VVOL being mounted to the host 101), the storage administrator uses the initial setup screen 1501 to select the initial medium (tier) corresponding to this VVOL. That is, at least the VVOL ID and the initial medium (tier) are selected. The storage management program 411 registers the selected VVOL ID and initial medium (tier) ID in the initial allocation policy table 413 inside the management system 103. The storage management program 411 also has the storage control program 311 inside the storage apparatus 109 register this VVOL ID and medium ID in the initial allocation policy table 316 inside the storage apparatus 109.

In the initial setup, in a case where the access-source WWN and the hostname are selected, and, in addition, the application name and the time period are inputted via the initial setup screen 1501, the storage management program 411 is able to register the access-source WWN and the time period in the initial allocation policy table 413. Further, the storage management program 411 is able to have the storage control program 311 register the access-source WWN and the time period in the initial allocation policy table 316. The storage management program 411 is also able to have the storage control program 311 register a combination of the application name, the hostname, and the time period in the application definition table 318.

The storage administrator does not have to input at least one of the access-source WWN and the time period. In accordance with this, the prescribed code "*" is registered as the value of the access-source WWN 902 and/or the time period 903 in the initial allocation policy table 316. The "*" here signifies that the conditions will be satisfied no matter what the access-source WWN and/or time period (the real area will be allocated from the defined initial medium).

(2) Write Process

Figure 14:
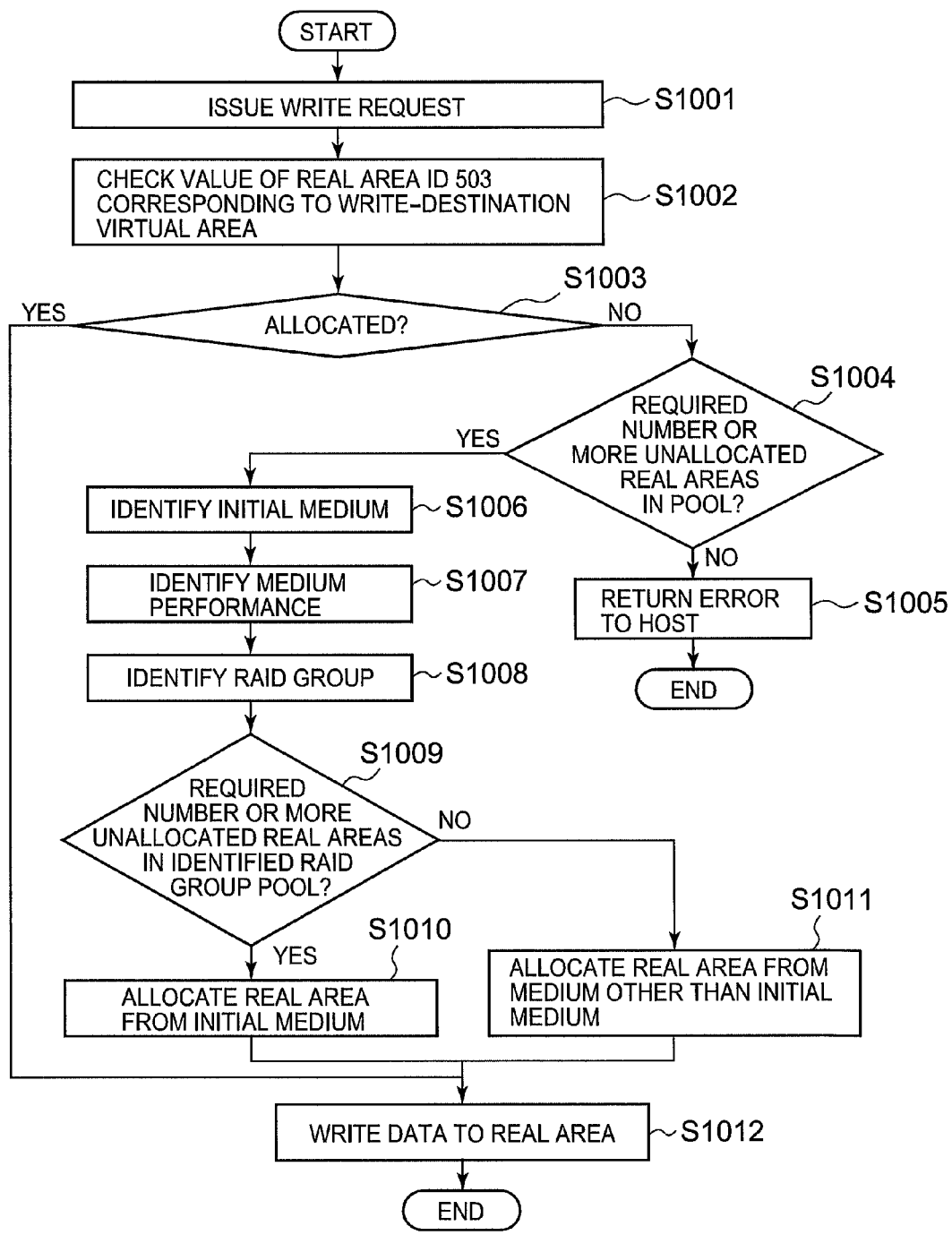
FIG. 14 is a flowchart showing the flow of processing of a write process.

FIG. 14 is a flowchart showing the flow of processing of a write process.

In S1001, the virtual host issues a write request. This write request comprises the virtual host WWN and write-destination information. The write-destination information comprises a LUN and the virtual area LBA. The write-destination information may also comprise the data size of the data (the write-targeted data) attached to the write request.

In S1002, the storage apparatus 109 receives the write request from the virtual host. The program 311 writes the write-targeted data to the cache memory area. Further, the storage control program 311 identifies the VVOL ID corresponding to the LUN of the write-destination information in the write request, and, in addition, identifies the real area ID 503 corresponding to the write-destination information from the VVOL management table 312.

In a case where the identified real area ID 503 is a valid value (a value denoting the ID of any real area) (S1003: YES), the program 311 writes the write-targeted data that is in the cache memory area to the real area identified from the identified real area ID 503 in S1002.

In a case where the identified real area ID 503 is an invalid value (a value signifying that the real area is not allocated) (S1003: NO), in S1004, the program 311 determines on the basis of the real area management table 313 whether or not an unallocated real area that is capable of being allocated to all the write-destination virtual areas (the virtual areas identified from the write-destination information) exist in the pool.

In a case where the result of the determination of S1004 is negative (S1004: NO), in S1005, the program 311 returns an error to the virtual host that was the source of the write request.

In a case where the result of the determination of S1004 is affirmative (S1004: YES), in S1006, the program 311 identifies the initial medium ID (the initial allocation tier 904) corresponding to the VVOL ID identified using the LUN inside the write-destination information, the virtual host WWN and the time at which the write request was received from the initial allocation policy table 316. Next, in S1007, the program 311 identifies the medium performance 802 corresponding to the identified initial medium ID from the storage tier definition table 315. Next, in S1008, the program 311 identifies the RAID group ID 701 of the RAID group that conforms to the PDEV type and RAID level denoted in the identified medium 802 from the RAID group management table 314.

In S1009, the program 311, using the ID that denotes the identified RAID group IS 701 as a key, determines from the real area management table 313 whether or not the plurality of real areas based on the RAID group identified from this ID include unallocated real areas that are capable of being allocated to all the write-destination virtual areas.

In a case where the result of the determination of S1009 is affirmative (S1009: YES), in S1010, the program 311 allocates the unallocated real area inside the initial medium to the write-destination virtual area, and in S1012, writes the data inside the cache memory area to this real area. Specifically, in S1010 the program 311 carries out the following updates.

(*) The program 311 updates the value of the real area ID 503 corresponding to the write-destination information in the VVOL management table 312 to the value denoting the ID of the allocated real area.

(*) The program 311 updates the values of the access-source WWN at allocation 505 and the allocation time 506 in the VVOL management table 312 to values denoting the virtual host WWN and the time at which the real area was allocated.

(*) The program 311 updates the value of the tier ID 504 in the VVOL management table 312 to the value denoting the ID of the medium that is the source of the real area.

(*) The program 311 updates the value of the allocation status 602 of the allocated real area in the real area management table 313 to a value denoting that allocation is complete.

In a case where the result of the determination of S1009 is negative (S1009: NO), in S1011, the program 311 allocates as many real areas as possible from the initial medium to the write-destination virtual area, allocates only enough real areas from another medium to the write-destination virtual area to make up the shortage, and thereafter, in S1012 writes the data inside the cache memory area to the allocated real areas.

Specifically, for example, in the above-mentioned S1011, in a case where there are 20 write-destination virtual areas and only 13 unallocated real areas in the initial medium, the program 311 allocates the 13 real areas to 13 write-destination virtual areas, and allocates 7 real areas from another medium to the remaining 7 write-destination virtual areas. As the "other medium" that serves as the source of real areas here is the medium that most closely approximates the performance of the initial medium (for example, the tier adjacent to the initial medium (tier)). In a case where there are adjacent media both above and below the initial medium at this time, the medium that has the most unallocated real areas may be selected as the "other medium" that serves as the source of the real areas. This is because selecting the adjacent medium with fewer unallocated real areas will increase the likelihood of this medium having a shortage of unallocated real areas when this medium is used as the initial medium.

Furthermore, in S1011, the VVOL management table 312 and the real area management table 313 are updated the same as in S1010.

As described hereinabove, in the write process an unallocated real area is preferentially allocated from the initial medium to one or more write-destination virtual areas. Furthermore, for example, in a case where there is a write to the VVOL "Volume 1" when the status is as shown in the initial allocation policy table 316 of FIG. 8, a real area is allocated from the initial medium "Tier 2" regardless of the write-source virtual host WWN and write time period.

Furthermore, in a case where a read request is sent from the virtual host, for example, the following processing is carried out.

(x1) The storage control program 311 receives the read request from the virtual host.

(x2) The program 311 identifies the read-source VVOL and the read-source virtual area based on the access-destination information in the read request.

(x3) The program 311 determines whether or not the read-targeted data is saved in the cache memory area.

(x4) In a case where the result of the determination of the above-mentioned (x3) is affirmative, the program 311 sends the read-targeted data of the cache memory area to the virtual host. The value of the access frequency 507 corresponding to the read-source virtual area may or may not be updated in accordance therewith.

(x5) In a case where the result of the determination of the above-mentioned (x3) is negative, the program 311 identifies the real area that is allocated to the read-source virtual area identified in the above-mentioned (x2) based on the VVOL management table 312. The program 311 reads the data from the identified real area and writes this data to the cache memory area. Then, the program 311 sends this data that is inside the cache memory area to the virtual host. The program 311 updates the value of the access frequency 507 corresponding to the read-source virtual area.

(3) Reallocation Process

Figure 15:
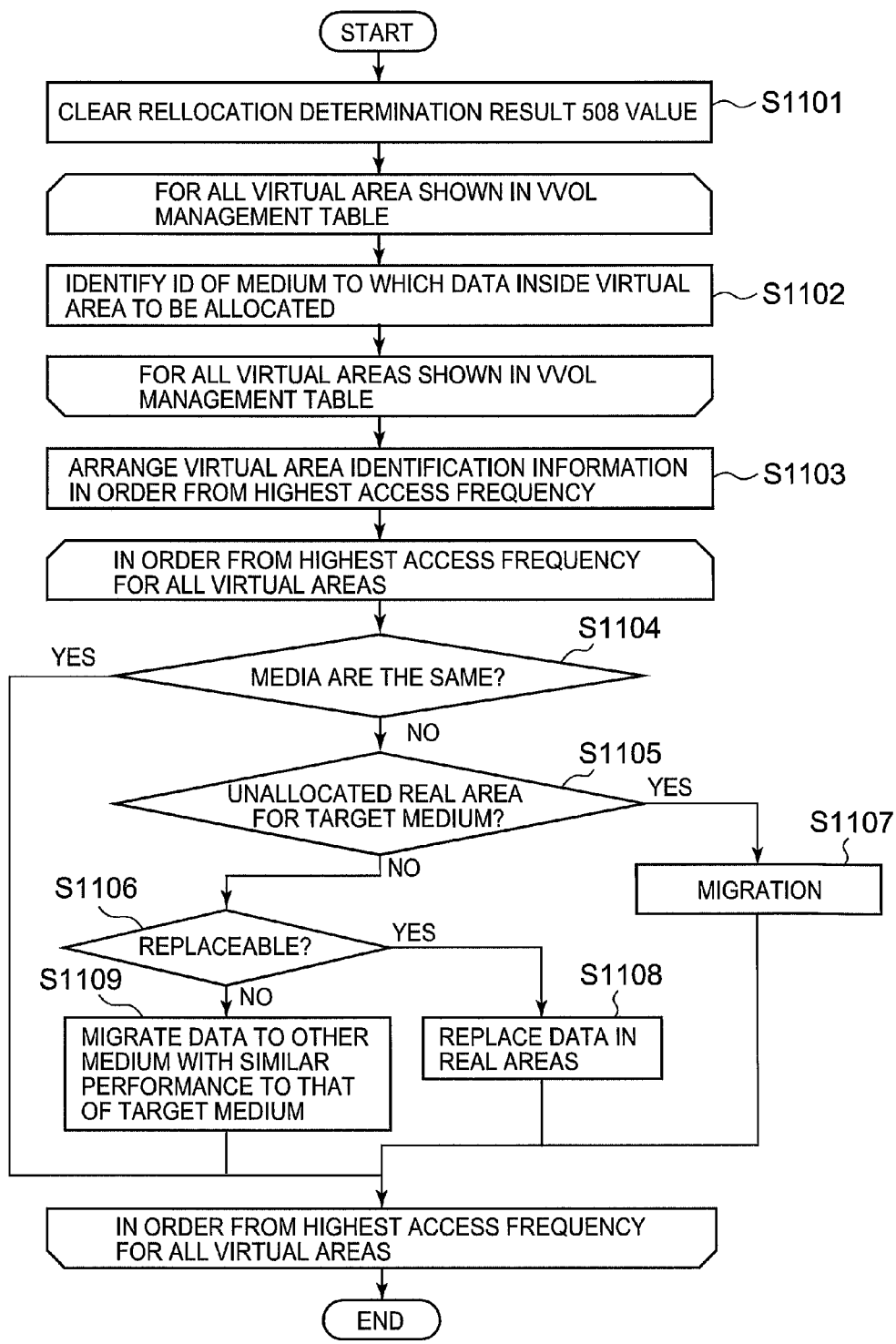
FIG. 15 is a flowchart showing the processing flow of a reallocation process.

FIG. 15 is a flowchart showing the flow of processing of the reallocation process. The reallocation process, for example, is carried out on a regular basis.

In S1101, the storage control program 311 clears the values of all the reallocation determination results 508 in the VVOL management table 312.

S1102 is carried out for all the virtual areas registered in the VVOL management table 312. In S1102, the program 311 identifies from the storage tier definition table 315 the access frequency range 603 denoting the access frequency range comprising the access frequency denoted by the access frequency 507 of the virtual area, and records the ID of the medium corresponding to this access frequency range 803 as the value of the reallocation determination result 508 corresponding to this virtual area. As a result of this, there are times when this medium ID is the same as the medium ID denoted in the tier ID 504 corresponding to this virtual area, and times when it is different.

In S1103, the program 311 arranges the virtual area identification information (for example, a combination of the VVOL ID and the LBA range) in the memory 304 in order from the access frequency 507 with the highest value.

The program 311 carries out S1104 and later steps in order (in the order in which the virtual area identification information is arranged in the memory 304) from the virtual area having the highest access frequency. S1104 and later steps will be explained hereinbelow using a single virtual area (referred to as the "target virtual area" in the explanation of FIG. 15) as an example.

In S1104, the program 311 determines whether or not the value of the tier ID 504 corresponding to the target virtual area matches the value of the reallocation determination process 508 corresponding to the target virtual area.

In a case where the result of the determination of S1104 is affirmative (S1104: YES), the processing with respect to the target virtual area is ended since a migration is not needed.

In a case where the result of the determination of S1104 is negative (S1104: NO), the program 311 makes a determination in S1105 based on the real area management table 313 as to whether or not there is an unallocated real area inside the medium (hereinafter referred to as the "target medium" in the explanation of FIG. 15) that is identified from the reallocation determination process 508 corresponding to the target virtual area.

In a case where the result of the determination of S1105 is affirmative (S1105: YES), the program 311 in S1107 migrates data from the real area (the migration-source real area) allocated to the target virtual area to the unallocated real area (the migration-destination real area) inside the target medium. The program 311 also allocates the migration-destination real area to the target virtual area in place of the migration-source real area. Specifically, the program 311 updates the value of the allocation status 602 corresponding to the migration-source real area to unallocated. Further, the program 311 updates the value of the real area ID 503 corresponding to the target virtual area to the ID of the migration-destination real area, and, in addition, updates the value of the tier ID 504 corresponding to the target virtual area to the ID of the target medium.

In a case where the result of the determination of S1105 is negative (S1105: NO), the program 311 determines in S1106 whether or not there is a replaceable real area. Specifically, for example, a determination is made as to whether or not there is data among the data inside the plurality of allocated real areas in the target medium that may be migrated to the real area allocated to the target virtual area.

In a case where the result of the determination of S1106 is affirmative (S1106: YES), the program 311 in S1108 replaces the real area. Specifically, for example, the program 311 carries out the following processing. The program 311 also updates the VVOL management table 312 and the real area management table 313 in accordance with the following processing.

(*) The program 311 writes the data (referred to as the "first data" in the explanation of FIG. 15) inside the real area (referred to as the "first real area" in the explanation of FIG. 15) allocated to the target virtual area to the cache memory area.

(*) The program 311 writes the data (referred to as the "second data" in the explanation of FIG. 15) inside the allocated real area (referred to as the "second real area" in the explanation of FIG. 15) of the target medium to the cache memory area.

(*) The program 311 writes the first data from the cache memory area to the second real area.

(*) The program 311 writes the second data from the cache memory area to the first real area.

In a case where the result of the determination of S1106 is negative (S1106: NO), the program 311 in S1109 migrates the data from the first real area to an unallocated real area inside a medium with performance that most closely approximates that of the target medium. The program 311 also updates the VVOL management table 312 and the real area management table 313 the same as in the processing of S1107.

The preceding has been an explanation of the reallocation process in a case where the access status is assumed to be the access frequency. In the case of another access status, the processing is as follows.

(*) In a case where the access load serves as the access status, the medium (tier) that conforms to the access load of each virtual area is identified on the basis of the storage tier definition table 315, and when the identified medium (tier) differs from the medium of the real area which is allocated to the relevant virtual area at the present time, a migration is carried out to the real area of the identified medium.

(*) In a case where the last access time serves as the access status, the medium (tier) that conforms to the last access time of each virtual area is identified on the basis of the storage tier definition table 315 based on the assumed access status of the storage tier definition table 315, which is defined on the basis of the last access time, and when the identified medium (tier) differs from the medium of the real area which is allocated to the relevant virtual area at the present time, a migration is carried out to the real area of the identified medium.

(4) Initial Allocation Policy Creation Process

Figure 16:
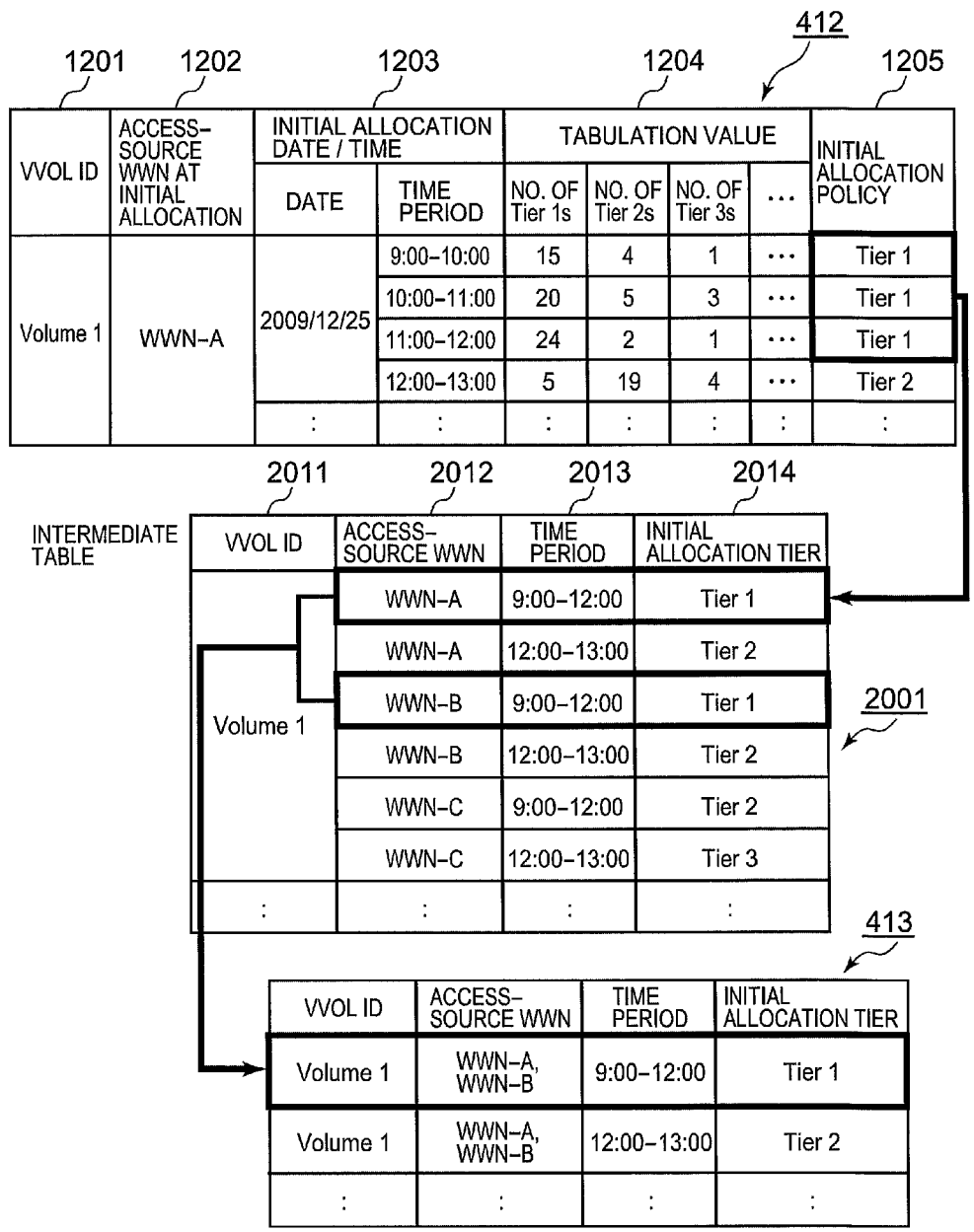
FIG. 16 shows the processing flow of an initial allocation policy creation process.

FIG. 16 shows the flow of processing of the initial allocation policy creation process.

The storage control program 411 inside the management system 103, for example, acquires the result of the reallocation process from the storage apparatus 109 each time the reallocation process shown in FIG. 15 is carried out. The program 411 records a VVOL ID 1201, a WWN 1202, an initial allocation time 1203, and information (a tabulation value) 1204 denoting the tabulation of acquired results in the reallocation log table 412. Specifically, the program 411 identifies the real area that was allocated via an initial allocation between the latest reallocation process and the reallocation process immediately previous thereto. This real area, for example, can be identified based on the time at which the latest reallocation process was carried out, the time at which the reallocation process immediately prior thereto was carried out, the VVOL ID 501, the WWN 505, the time 506, and the initial allocation tier 904. The program 411 tabulates the media to which the data inside the real area allocated in the initial allocation was migrated for each combination of the access-source WWN at the initial allocation time and the initial allocation time period (that is, the application). The program 411 updates the reallocation log table 412 together with this tabulation result. At this time, the program 411 updates the value of the initial allocation tier 1205 corresponding to a certain application (the combination of the access-source WWN at initial allocation and the initial allocation time period) to the ID of the medium having the largest number of real areas in the tabulation value 1204 corresponding to this application.

Next, based on the reallocation log table 412, the program 411 executes a process that groups together a series of time periods for which the values of the initial allocation tiers 1205 are the same into a single initial allocation policy for each access-source WWN with regard to the respective VVOL. Specifically, for example, the program 411 prepares an intermediate table 2001 in the memory 304. The program 411 registers the value of the VVOL ID 1201 in the intermediate table 2001 as the value of the VVOL 2011, and registers the value of the WWN 1202 in the intermediate table 2001 as the value of the access-source WWN 2012. The program 411 identifies from the reallocation log table 412 the record in which the value of this WWN 2012 and the value of the initial allocation tier 1205 are both the same. In a case where two or more time periods denoted by two or more identified records are consecutive (for example, when the time periods are sequential as in 9:00-10:00, 10:00-11:00, and 11:00-12:00), the program 411 groups the two or more time periods together into one time period (for example, groups the three time periods 9:00-10:00, 10:00-11:00, and 11:00-12:00 into a single time period 9:00-12:00). The program 411 registers a value denoting the time periods, which have been grouped together into one time period, in the intermediate table 2001 as the value of the time period 2013. The program 411 registers the value of the initial allocation tier 1205 as the value of the initial allocation tier 2014.

Next, the program 411 compares the values of the initial allocation tiers 2014 with the access-source WWNs that have the same time period 2013 for each VVOL. In a case where the values of the initial allocation tiers 2014 are identical to one another, the program 411 registers the plurality of WWNs as the values of the access-source WWN 902 in one record (row) of the initial application policy table 413. The VVOL ID, the time period (the time periods that have been grouped together into a single time period), and the initial medium ID are registered in this record.

The program 411 sends an update request comprising update information, which is information denoted by the post-update initial allocation policy table 413 (or information denoting the difference between the post-update initial allocation policy table 413 and the pre-update initial allocation policy table 413), to the storage apparatus 109. The storage apparatus 109 receives the update request, the storage control program 311 responds to this update request, and based on the update information of this update request updates the initial allocation policy table 316 so that the contents are the same as those of the post-update initial allocation policy table 413.

As described hereinabove, in the initial allocation policy creation process, information that is the result of grouping together common information in the reallocation log table 412 is registered in the initial allocation policy table 413, and the initial allocation policy table 316 inside the storage apparatus 109 is updated to the same contents as those of this initial allocation policy table 413. This makes it possible to keep the number of records of the initial allocation policy tables 413 and 316 to the minimum. This contributes to preventing a drop in write process performance. This is because a smaller number of records lessens the load when searching the initial allocation policy table 316. The smaller number of records also reduces the amount of capacity consumed in the memories 304 and 402.

Furthermore, a procedure other than the procedures described hereinabove (for example, data clustering) may be used as the tabulation procedure in the initial allocation policy creation process.

Further, the updating of the initial allocation policy tables 413 and 316 based on the tabulation of the results of reallocation processing may either be carried out without receiving a clear instruction from the user, or may be carried out after responding to the receipt of a clear instruction from the user. In a case where the updating of the initial allocation policy tables 413 and 316 is carried out upon receiving a clear instruction from the user, for example, an initial allocation policy definition screen 1401, which is shown in FIG. 17, is displayed on the display device 451 of the management system 103 by the storage control program 411.

In the screen 1401, there is displayed the pre-update initial allocation policy table 413, a table 1701 that merges the host management table 317 and the application definition table 318, a tentative post-update initial allocation policy table 413, and a table 1703 that merges the host management table 317 and the application definition table 318.

The "tentative post-update initial allocation policy table 413" is the as-yet-to-be-updated initial allocation policy table 413 showing how it is assumed the initial allocation policy table 413 will look once it is updated. The information denoting the tentative post-update initial allocation policy table 413 is displays as recommended information.

The values of the "hostname" in the tables 1701 and 1703 are the values of the hostnames 1001 corresponding to the WWNs in the table 413. The values of the "application name" in the tables 1701 and 1703 are the values of the application names 1101 corresponding to the value of the above-mentioned "hostname" and time period 903.

Information denoting one initial allocation policy is displayed in one record of table 1703, and, in addition, a check box is displayed. When a check mark is placed in the check box and the "apply" button 1705 is pressed, the program 411 registers, in the initial allocation policy tables 413 and 316, the information (the initial allocation policy) denoted in the check marked record. That is, the storage administrator is able to select whether or not the definition is to be made in an initial allocation policy unit. When the "details" button 1706 is pressed instead of the "apply" button 1705, the program 411 displays the portion of the reallocation log table 412 related to the information (the initial allocation policy) denoted in the check marked record.

The preceding has been an explanation of this embodiment.

According to this embodiment, even when the VVOL is used in a plurality of applications, an appropriate initial medium is determined for each application (combination of a virtual host WWN and a time period) just by defining the initial medium in VVOL units.

An embodiment of the present invention has been explained hereinabove, but the present invention is not limited to this embodiment, and it goes without saying that various changes can be made without departing from the gist thereof.

For example, in the embodiment, the initial medium is associated to both the virtual host WWN and the time period to which the write time belongs, but the initial medium may be associated with only one of these.

Further, the present invention is also applicable to a host for which host virtualization technology has not been applied, and in this case, the WWN becomes the host WWN. The identification information is not limited to the WWN, and other types of access-source identification information (for example, a port ID or IP address) may be used.

Further, for example, the initial allocation policy table 316 need not be used. In accordance with this, the storage control program 311 may determine a medium in accordance with a write each time there is a write, and may allocate a real area from the determined medium to the write-destination virtual area. Specifically, for example, the program 311 may determine the medium regarded as the initial medium based on another type of write-related information either besides or in addition to the write-source identification information and the write time, such as a write data attribute (for example, the size or format of the write data) or a write request attribute (an information element of the write request), may allocate a real area to this medium, and may write the write-targeted data to the allocated real area.

Further, in the above explanation, in a case where a real area is registered in a pool, the explanation was given on the premise that a RAID group is created, a logical volume is created from the RAID group, and the logical volume is registered in the pool. However, in a case where a different type of physical storage device is registered in the pool for providing the real area, another registration system may be used. For example, the following is conceivable.

(*) The RAID group is registered in the pool without creating the logical volume.

(*) The physical storage device is registered in the pool. When a real area allocation is required in this case, the storage apparatus selects the required real area in accordance with the virtual volume, the pool, or the access-source WWN, or the RAID level and combination specified by the time period, allocates the real area to the virtual area, and stores the write data in the allocated real area.

Furthermore, as explained above, since this embodiment discloses the fact that the initial allocation tier of the real area is determined based on both the access-source identification information and the time period, the advantage of this embodiment is that a suitable initial allocation is realized for each application, or for each virtual host or for each host. However, the invention of the application may determine the initial allocation tier of the real area based on the access-source identification information without using the time period. This embodiment is significant in that a suitable initial allocation is realized for either each host or each virtual host, and is able to realize this initial allocation without acquiring the information inside either the virtual host or the host as shown in FIGS. 10 and 11, making it very convenient for the computer system administrator.

Determining the initial allocation tier of the real area based on one time period is significant in that it makes it possible more detailed control than the access-source identification information in a case where one virtual host or host is used with a plurality of applications.

Furthermore, in the above explanation, a case in which a plurality of virtual hosts use a single virtual volume was explained, but the invention of this application is technology that is also applicable in a case where a plurality of applications or hosts other than a virtual host utilize a single virtual volume.

What is claimed is:

1. A method for controlling data write to a virtual volume, which is a virtual logical volume that conforms to Thin Provisioning, and is a logical volume configured from a plurality of virtual areas and used by a plurality of applications, the method comprising the steps of:

(A) receiving a write request including write-destination information for identifying a virtual area of a write destination in the virtual volume;

(B) determining whether or not the write-destination virtual area identified based on the write-destination information is an unallocated virtual area; and (C) in a case where the result of the determination of the (B) is affirmative, selecting an initial allocation medium corresponding to the request source of the write request, based on a policy, from among a plurality of media, each of which has a different performance and is configured from two or more real areas, and allocating a real area from among the real areas based on the selected initial allocation medium as the write-destination virtual area of the write request, wherein the policy is information including information representing a correspondence relationship between the applications, the media associated with the applications as initial allocation media, and request sources sending write requests and executing the applications.

2. A method according to claim 1, wherein the policy is further configured to represent a correspondence relationship between the applications and policy applied time periods, wherein, in (C), in a case where not only the result of the determination of the (B) is affirmative but also receipt time of the write request issued from the request source executing the application belongs to the policy applied time period corresponded to the application, selecting the initial allocation medium and allocating the real area on the write destination virtual area.

3. A method according to claim 2,
wherein, in the policy, as for at least one of the applications, at least one of the request source and the policy applied time period means all request sources or all the policy applied time periods.

4. A method according to claim 2,
wherein, in a case where the write destination virtual areas is less than unallocated real areas based on the initial allocation medium, in (C), allocating not only the unallocated real areas based on the initial allocation medium but also unallocated real areas based on other than the selected initial allocation medium, of which the number is the same as a difference between the number of the unallocated real areas based on the initial allocation medium and the number of the write destination virtual areas.

5. A method according to claim 2,
wherein a plurality of data from the same write request source is written to the initial allocation medium in the policy applied time period,
comprising the further steps of:
moving the plurality of data by reallocation process; and
changing the policy, after the reallocation process, so as to determine medium storing the most data of the plurality of written data as a new initial allocation medium.

6. A storage apparatus for controlling data write to a virtual volume, which is a virtual logical volume that conforms to Thin Provisioning, and is a logical volume configured from a plurality of virtual areas and used by a plurality of applications,
the storage apparatus comprising:
an interface device configured to receive a write request including write-destination information for identifying a virtual area of a write destination in the virtual volume; and
a controller configured to:
(A) determine whether or not the write-destination virtual area identified based on the write-destination information is an unallocated virtual area, and
(B) in a case where the result of the determination of the (A) is affirmative, select an initial allocation medium corresponding to the request source of the write request, based on a policy, from among a plurality of media, each of which has a different performance and is configured from two or more real areas, and allocate a real area from among the real areas based on the selected initial allocation medium as the write-destination virtual area of the write request,
wherein the policy is information including information representing a correspondence relationship between the applications, the media associated with the applications as the initial allocation media, and request sources sending write requests and executing the applications.

7. A storage apparatus according to claim 6,
wherein the policy is further configured to represent a correspondence relationship between the applications and policy applied time periods,
wherein, as for (B), the controller is configured to select the initial allocation medium and allocate the real area on the write destination virtual area, in a case where not only the result of the determination of the (A) is affirmative but also receipt time of the write request issued from the request source executing the application belongs to the policy applied time period corresponded to the application.

8. A storage apparatus according to claim 7,
wherein, in the policy, as for at least one of the applications, at least one of the request source and the policy applied time period means all request sources or all the policy applied time periods.

9. A storage apparatus according to claim 7,
wherein, in a case where the write destination virtual areas is less than unallocated real areas based on the initial allocation medium, as for (B), the controller is configured to allocate not only the unallocated real areas based on the initial allocation medium but also unallocated real areas based on other than the selected initial allocation medium, of which the number is the same as a difference between the number of the unallocated real areas based on the initial allocation medium and the number of the write destination virtual areas.

10. A storage apparatus according to claim 9,
wherein a plurality of data from the same write request source is written to the initial allocation medium in the policy applied time period,
wherein the controller is further configured to:
move the plurality of data by reallocation process, and
change the policy, after the reallocation process, so as to determine medium storing the most data of the plurality of written data as a new initial allocation medium.

\* \* \* \* \*